United States Patent
Suzuki (10) Patent No.: US 12,327,416 B2
(45) Date of Patent: Jun. 10, 2025

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Ryuta Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 18/321,066

(22) Filed: May 22, 2023

(65) Prior Publication Data
US 2023/0394847 A1 Dec. 7, 2023

(30) Foreign Application Priority Data

Jun. 7, 2022 (JP) .................................. 2022-092250

(51) Int. Cl.
| | |
|---|---|
| G06V 20/58 | (2022.01) |
| B60W 50/14 | (2020.01) |
| G06T 7/60 | (2017.01) |
| G06T 7/70 | (2017.01) |

(52) U.S. Cl.
CPC ........... *G06V 20/586* (2022.01); *B60W 50/14* (2013.01); *G06T 7/60* (2013.01); *G06T 7/70* (2017.01); *G06T 2207/30264* (2013.01)

(58) Field of Classification Search
CPC ..... G06V 20/586; G06V 20/58; B60W 50/14; G06T 7/60; G06T 7/70; G06T 2207/30264
See application file for complete search history.

(56) References Cited

U.S. PATENT DOCUMENTS

| | | | | |
|---|---|---|---|---|
| 11,220,269 | B2* | 1/2022 | Xu | B60W 40/076 |
| 2018/0180719 | A1* | 6/2018 | Bier | G01S 17/08 |
| 2019/0106163 | A1* | 4/2019 | Fahland | B62D 37/02 |
| 2019/0135180 | A1* | 5/2019 | Watatsu | B60R 1/12 |
| 2020/0003888 | A1* | 1/2020 | Fujitsu | G01S 13/931 |
| 2020/0016951 | A1* | 1/2020 | Letizio | B60G 17/0165 |
| 2021/0179076 | A1* | 6/2021 | Nakada | G06V 20/58 |
| 2021/0224559 | A1* | 7/2021 | Rider | B60C 23/002 |
| 2021/0323371 | A1* | 10/2021 | Letizio | B60R 11/04 |

FOREIGN PATENT DOCUMENTS

JP 2021-94933 A 6/2021

* cited by examiner

*Primary Examiner* — Timothy R Newlin
(74) *Attorney, Agent, or Firm* — Carter, DeLuca & Farrell LLP (57) ABSTRACT

Provided is an image processing system that is capable of preventing contact between an obstacle and a movable apparatus regardless of the state of the movable apparatus, comprising an obstacle information acquisition unit configured to detect a position and a height of an obstacle in a traveling direction of a movable apparatus, a ground clearance detection unit configured to detect the ground clearance, which is the height from the ground surface in the traveling direction of the movable apparatus to the movable apparatus, a contact determination unit configured to determine whether or not the movable apparatus and the obstacle will come into contact with each other in the traveling direction of the movable apparatus based on the position and height of the obstacle and the ground clearance, and a warning output unit configured to output a warning in a case in which it has been determined by the contact determination unit that contact will occur.

12 Claims, 6 Drawing Sheets

IMAGE PROCESSING SYSTEM, IMAGE PROCESSING METHOD, AND STORAGE MEDIUM

BACKGROUND OF THE INVENTION

Field of the Invention

The present invention relates to an image processing system, an image processing method, and a storage medium and the like for preventing contact with an obstacle.

Description of the Related Art

In recent years, as a parking assistance system, there are systems that display on a monitor inside a vehicle an overhead image as if the vehicle were seen from above, or an image captured of behind the vehicle. In addition, Japanese Patent Laid-Open No. 2021-94933 discloses a technology that suppresses an impact when a wheel contacts a parking block by performing parking control based on the distance between the parking block and the vehicle during parking.

However, in Japanese Patent Laid-Open No. 2021-94933, because vehicle control is performed considering only the height of the parking block, depending on the height of the parking block and the state of the vehicle, there is a possibility that the parking block may come in contact with the body of the vehicle. For example, in a case in which the loadage of the vehicle is large, because the vehicle body is lowered, the possibility of contact between the parking block and the vehicle body increases.

Accordingly, one of objects of the present invention is to provide an image processing system that is capable of preventing contact between an obstacle and a movable apparatus, regardless of the state of the movable apparatus.

SUMMARY OF THE INVENTION

To achieve the above-described objective, an image processing system according to one aspect of the present invention includes at least one processor or circuit configured to function as:
  an obstacle information acquisition unit configured to detect a position and a height of an obstacle in a traveling direction of a movable apparatus,
  a ground clearance detection unit configured to detect the ground clearance, which is the height from the ground surface in the traveling direction of the movable apparatus to the movable apparatus,
  a contact determination unit configured to determine whether or not the movable apparatus and the obstacle will come into contact with each other in the traveling direction of the movable apparatus based on the position and height of the obstacle, and the ground clearance, and
  a warning output unit configured to output a warning in a case in which it has been determined by the contact determination unit that contact will occur.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
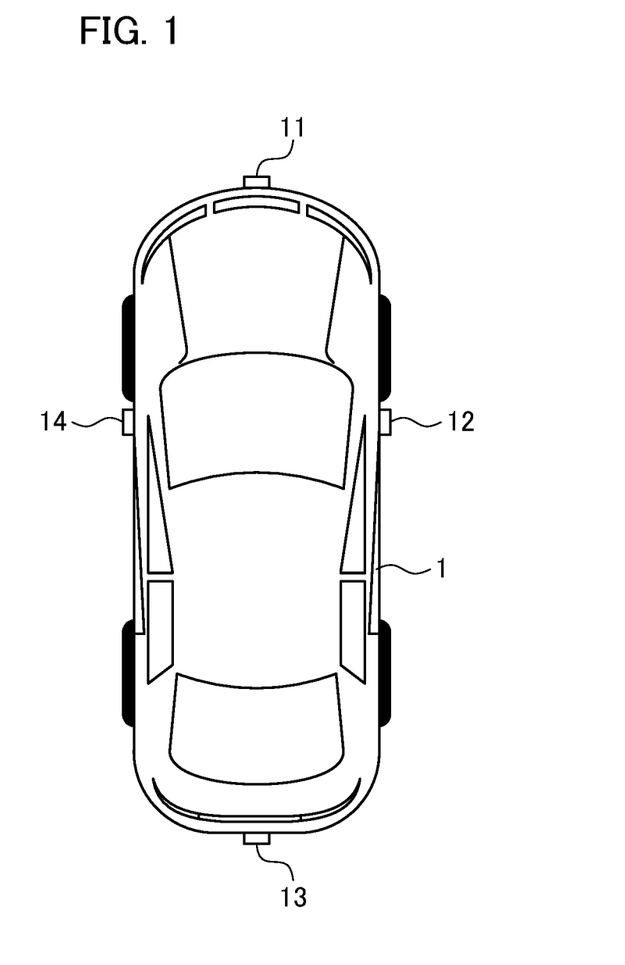
FIG. 1 is a diagram that explains a positional relationship between a camera unit and a vehicle serving as a movable apparatus according to an example of the present invention.

Examples of the present invention will be explained with reference to FIG. 1 to FIG. 9. FIG. 1 is a diagram that explains a positional relationship between a camera unit and a vehicle as a movable apparatus according to an example.

As shown in FIG. 1, in the present embodiment, camera units 11, 12, 13, and 14 are installed, respectively, on the front, the right side, the rear, and the left side of a vehicle 1 of an automobile, for example, as a movable apparatus (main movable apparatus). It should be noted that although four camera units are included in the present embodiment, the number of camera units is not limited to four, and at least one or more camera units may be present.

It should be noted that the image capturing directions of the camera units 11 to 14 are set so that each of the front, right side, left side, and rear of the vehicle 1 serving as a movable apparatus is set to be an image capturing range.

In the present embodiment, the camera units 11 to 14 have substantially the same configuration, and each has an image capturing element that captures an optical image, and an optical system that forms an optical image on the light-receiving surface of the image capturing element.

It should be noted that, for example, the optical axes of the optical systems of the camera units 11 and 13 are disposed so as to be substantially horizontal when the vehicle 1 is horizontal, and the optical axes of the optical systems of the camera units 12 and 14 are disposed so as to face slightly below horizontal or so as to face straight downward. Furthermore, the optical systems included in the camera units 11 to 14 that are used in the present embodiment are provided with a fisheye lens or wide-angle lens capable of capturing a wide view of the surroundings.

Figure 2:
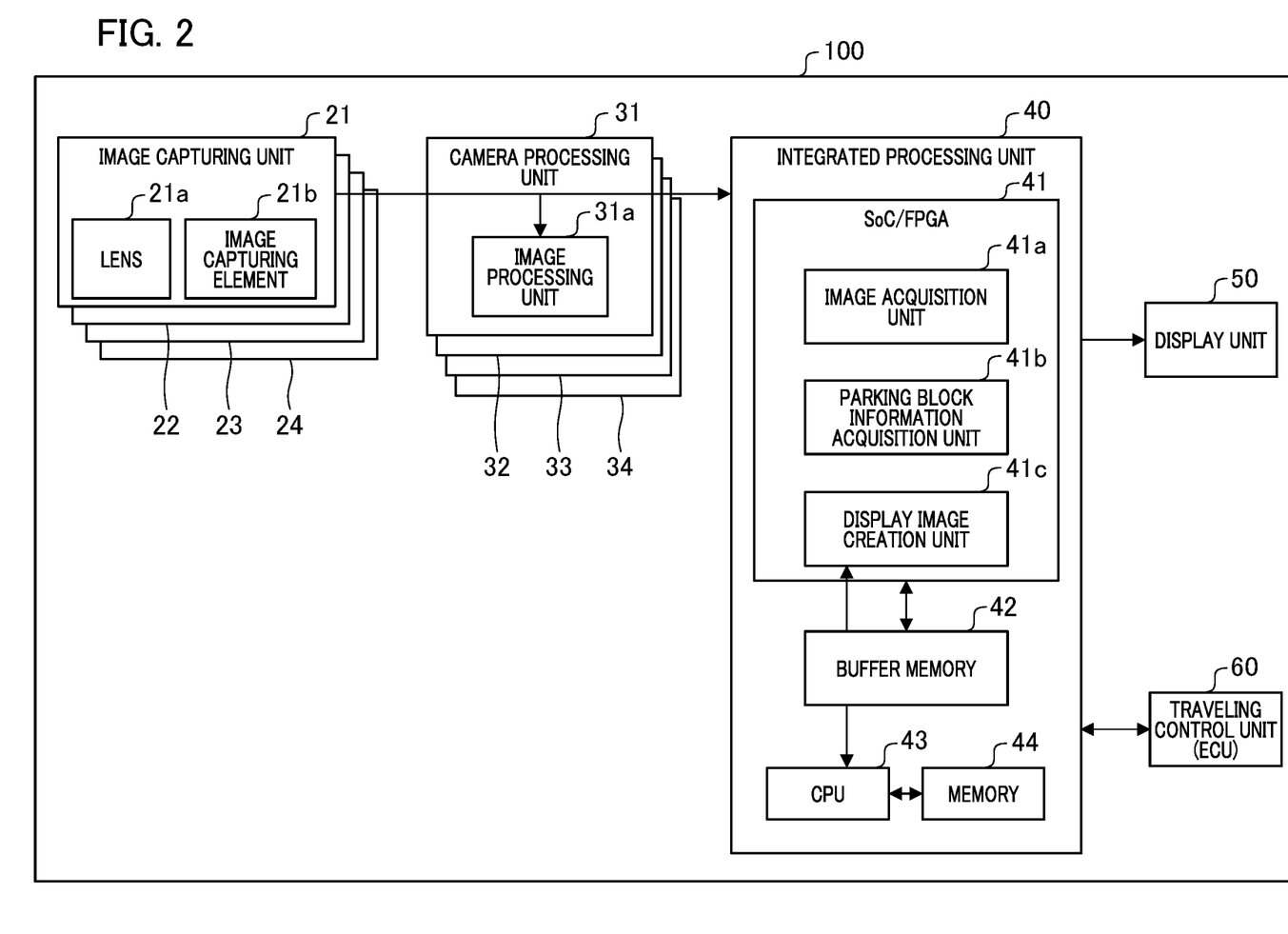
FIG. 2 is a functional block diagram for explaining a configuration of an image processing system according to the example.

Next, the configuration of the image processing system in the present embodiment will be explained with reference to FIG. 2. FIG. 2 is a functional block diagram for explaining a configuration of an image processing system according to the example.

It should be noted that a part of the functional blocks that are shown in FIG. 2 is implemented by causing the CPU 43 to serve as a computer that is included in an image processing system 100 to execute a computer program that has been stored in a memory 44 serving as a storage medium. However, a part or all of these may be realized by hardware. As hardware, a dedicated circuit (ASIC), a processor (reconfigurable processor, DSP) and the like may be used.

In addition, each of the functional blocks shown in FIG. 2 may be configured by separate devices that are connected to each other a via signal path, without having to be incorporated in the same housing. In FIG. 2, the image processing system 100 is mounted on a vehicle 1 as a movable apparatus, and the camera units 11 to 14 are each configured by the image capturing units 21 to 24 and camera processing units 31 to 34.

The image capturing units 21 to 24 each include lenses 21a to 24a and image capturing elements 21b to 24b, such as a complementary metal oxide semiconductor (CMOS) image sensor or a charge coupled diode (CCD) image sensor. The image capturing elements 21b to 24d are so-called image capturing plane phase difference-type sensors.

That is, all pixels of the image capturing surface are each configured by a pair of light-receiving elements, and in each pixel, a pair of optical images having different parallax that pass through different pupil regions via a microlens are configured so as to enable generation of a pair of image capturing signals by photoelectric conversion by a pair of light receiving elements.

The lenses 21a to 24a serving as optical systems are configured by one or more optical lens, and form optical images on the light-receiving surfaces of each of image capturing elements 21b to 24b. Image capturing elements 21b to 24b function as image capturing units, and output image capturing signals by photoelectrically converting optical images. On the light-receiving surfaces of image capturing elements 21b to 24b, for example, an RGB color filter is arranged on each pixel. The RGB color filter is, for example, a Bayer array.

Thus, the image capturing element is configured so that, for example, R, G, R, G signals are sequentially output from a predetermined row according to a Bayer array, and G, B, G, B, signals are sequentially output from the adjacent row.

31 to 34 are camera processing units each configured to process the image signals that have been output from the image capturing units 21 to 24. It should be noted that in FIG. 2, details of the image capturing unit 24, the camera processing unit 34, and the wiring thereof are omitted for convenience.

The camera processing units 31 to 34 each include image processing units 31a to 34a. It should be noted that some or all of the camera processing unit 31 may be installed in a stacked signal processing unit in the image capturing elements 21b to 24b. The image processing units 31a to 34a each perform image processing on the image signals that have been output from the image capturing units 21 to 24.

Specifically, the image processing units 31a to 34a de-Bayer process each of the image data that was input from the image capturing units 21 to 24 according to the Bayer array, and convert the image data into RGB raster format image data. In addition, various correction processes such as white balance adjustment, gain/offset adjustment, gamma processing, color matrix processing and lossless compression processing are performed. However, it is desirable that lossy compression processing and the like is not performed.

In addition, as described previously, the image capturing elements 21b to 24b are image capturing plane phase difference-type image capturing elements, and the image processing units 31a to 34a create a defocus map by using a known distance measurement unit and send it to, for example, the integrated processing unit 40, and store it in a buffer memory 42.

It should be noted that the camera processing units 31 to 34 incorporate a CPU serving as a computer and a memory serving as a storage medium in which a computer program is stored. In addition, the CPU is configured to control each of the camera processing units 31 to 34 by executing a computer program that has been stored in the memory.

It should be noted that in the present embodiment, the image processing units 31a to 34a use hardware such as, for example, a dedicated circuit (ASIC) or a processor (reconfigurable processor, DSP). Thereby, it is possible to speed up image recognition in high-resolution areas. It should be noted that the image processing units 31a to 34a may have a distortion correction function to correct distortion of the lenses 21a to 24a.

It should be noted that, although some or all of the internal functional blocks of the camera processing units 31 to 34 may be implemented by causing the CPU to execute a computer program stored in memory, in such a case, it is desirable to increase the processing speed of the CPU.

40 is an integrated processing unit, which includes a System On Chip (SOC)/Field Programmable Gate Array (FPGA) 41, a buffer memory 42, a CPU 43 serving as a computer, and a memory 44 serving as a storage medium.

The CPU 43 performs various controls of the entire image processing system 100 by executing the computer program that is stored in the memory 44. It should be noted that in the present embodiment, the integrated processing unit 40 is housed in a housing that is separate from the camera unit.

The SOC/FPGA 41 includes an image acquisition unit 41a, which is a unit that receives the output images from the camera processing units 31 to 34, a parking block information acquisition unit 41b as a parking block information detection unit, and a display image creation unit 41c.

The image acquisition unit 41a acquires the respective image signals from the camera processing units 31 to 34, outputs the acquired image signals to the parking block information acquisition unit 41b, and also stores the image signals in the buffer memory 42.

The parking block information acquisition unit 41b detects the presence of an obstacle such as a parking block by applying a predetermined algorithm to the image in the traveling direction among a plurality of image signals that has been input from the image acquisition unit 41a, and detects the size and position information of the parking block (obstacle) in pixel units. That is, the parking block information acquisition unit 41b functions as an obstacle information acquisition unit to detect the position and height of an obstacle in the traveling direction of the movable apparatus.

As a predetermined algorithm, a learning model (inference model) may be acquired that has learned in advance to input a data set that includes at least a parking block image, and to detect the position and height of an obstacle in the traveling direction of the movable apparatus by deep learning from the input image.

The position and height of an obstacle in the traveling direction of the movable apparatus may be detected from the input image by using a learning model (inference model). In addition, a configuration is also possible in which a parking block is detected based on various known image features such as SIFT, HoG, SURF, ORB, and the like.

In addition, the parking block information acquisition unit 41b acquires the distance of the parking block (obstacle) based on the position of the detected parking block (obstacle) and the defocus map that has been stored in the buffer memory 42. In addition, when detecting a parking block, it is desirable to avoid the detection of parking blocks in other parking spaces. For example, the parking block detection processing may be configured to be limited to an image area that corresponds to the parking space of vehicle 1 that has been detected by a known parking space detection technology.

In addition, based on the information from a traveling control unit (ECU) 60, a configuration is also possible in which the parking block detection processing is performed only in a case in which the traveling direction becomes substantially straight with respect to the vehicle body of the vehicle 1. It should be noted that the detection unit that detects the distance to the parking block can be configured with a stereo camera or a combination of a camera for image capturing and a sonar or sensor for distance information acquisition. In the case of a stereo camera, the parking block information acquisition unit 41b can be configured to perform parallax calculation processing, and calculate the distance to the parking block.

The display image creation unit 41c generates a display image to be displayed on the display unit 50 from the image that has been stored in the buffer memory 42. For example, a captured image of the vehicle 1 in the traveling direction, or an overhead image obtained by synthesizing a plurality of captured images is generated and output as a display image. In addition, the display image creation unit 41c also performs image generation in which a warning display or the like is superimposed on the image stored in buffer memory 42 based on an instruction from the CPU 43.

Display unit 50 displays the display image that was generated by display image creation unit 41c. The display unit 50 is configured to be capable of displaying an arbitrary image, and is installed, for example, around an operation panel near the center of the vehicle in the width direction in front of the driver's seat of the vehicle 1.

The traveling control unit (ECU) 60 is a unit that incorporates a computer and a memory to perform comprehensive drive control, directional control, and the like of the vehicle 1. The traveling control unit (ECU) 60 is configured to be capable of outputting a vehicle control signal to the integrated processing unit 40.

The vehicle control signal output by the traveling control unit (ECU) 60 includes, for example, information related to the traveling (moving state) of the vehicle, such as traveling speed, traveling direction, shift lever, shift gear, indicator status, and vehicle orientation by use of a geomagnetic sensor or the like.

Figure 3:
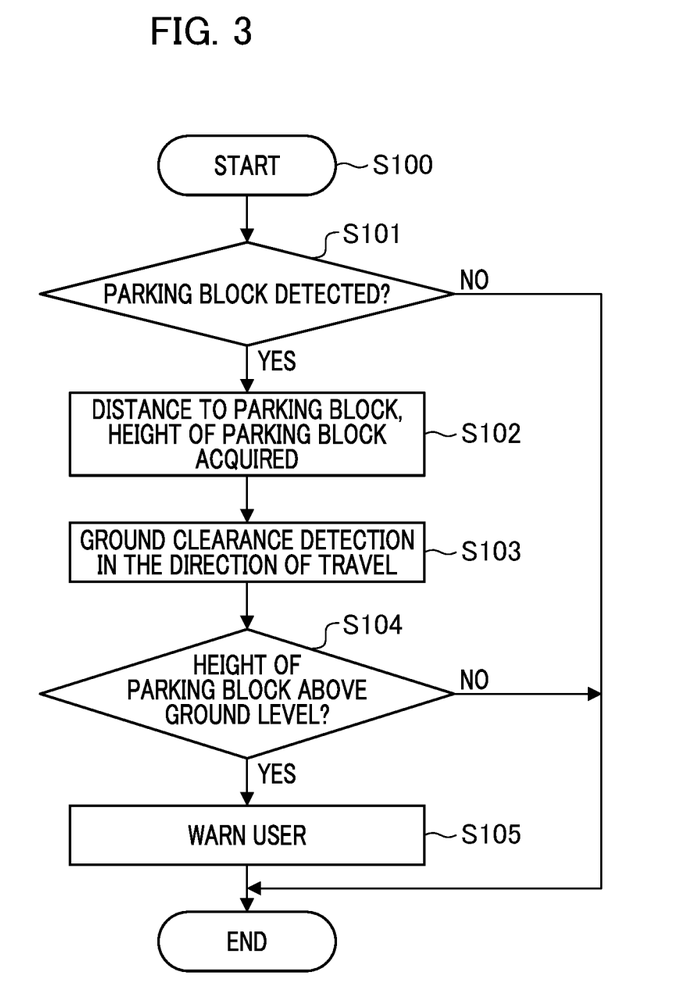
FIG. 3 is a flowchart for explaining a series of operations of the integrated processing unit 40 of the example.

FIG. 3 is a flowchart for explaining a series of operations of the integrated processing unit 40 of the example. Each of the processing steps from step S101 to step S105 of FIG. 3 is performed sequentially by the CPU 43 of the integrated processing section 40 executing the computer program in the memory 44.

In the present embodiment, the processing steps from step S101 to step S105 are executed each time the image acquisition unit 41a periodically acquires an image from the camera processing units 31 to 34 while the power supply of the image processing system 100 is ON. It should be noted that periodic execution may be set to be triggered when vehicle 1 is below a predetermined speed (for example, 10 km/h), or when the vehicle 1 detects (acquires) a space to park by using a known parking space detection technology.

In step S101, the CPU 43 refers to the buffer memory 42, and determines whether or not the parking block information acquisition unit 41b detects a parking block. In a case in which the CPU 43 determines that a parking block is detected, the CPU 43 advances the processing to step S102, and in a case in which it determines that no parking block is detected, the flow of FIG. 3 is terminated.

Figure 4:
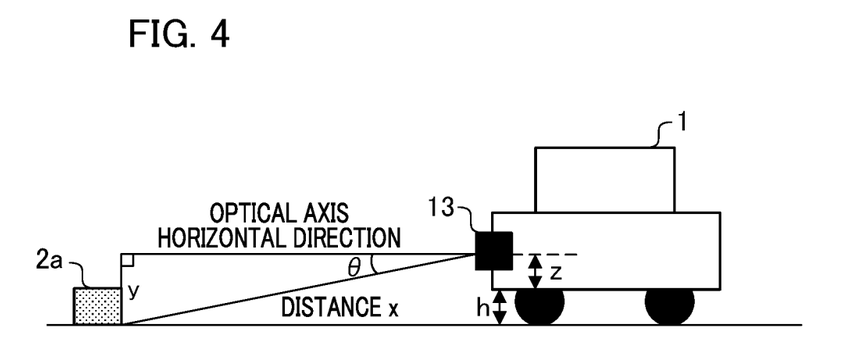
FIG. 4 is a diagram showing an example of a method for acquiring a ground clearance h in a traveling direction when the vehicle 1 is traveling backward.
Figure 5:
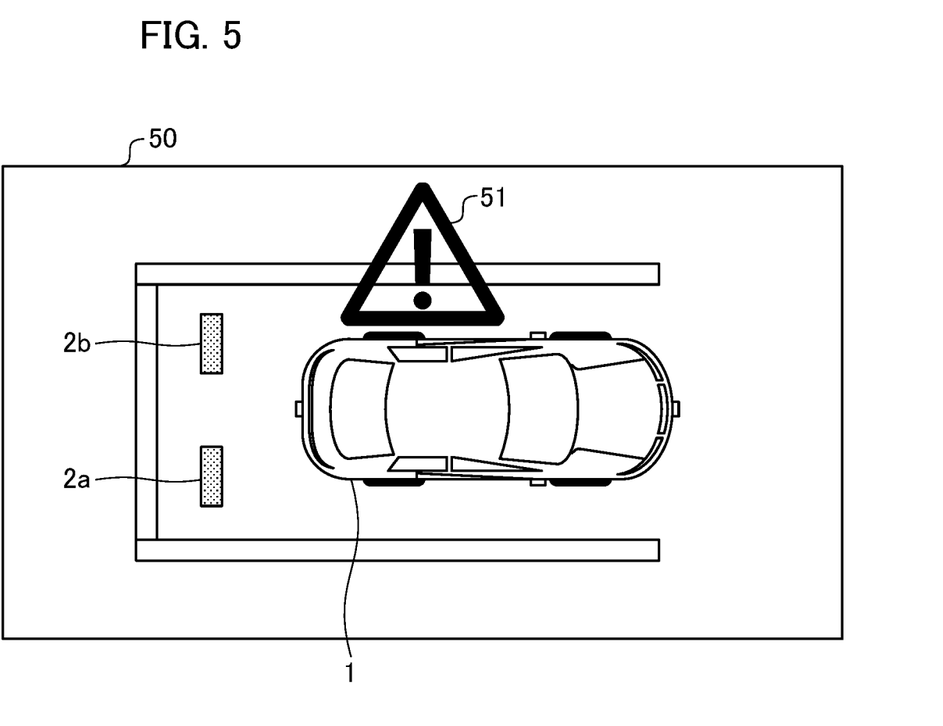
FIG. 5 is a diagram showing one example of a warning display that is superimposed on an overhead image that is displayed on the display unit 50 of the example.

In step S102, the CPU 43 refers to the buffer memory 42, and acquires the distance (position) to parking blocks 2a and 2b, as shown in FIG. 4 and FIG. 5, for example, detected by the parking block information acquisition unit 41b, and the height of the parking block. That is, step S102 functions as an obstacle information acquisition step (obstacle information acquisition unit) to detect the position and height of an obstacle in the traveling direction of the movable apparatus.

In step S103, the CPU 43 calculates the ground clearance in the traveling direction of the vehicle 1 based on the information that was acquired in step S102. That is, step S103 functions as a ground clearance detection step (ground clearance detection unit) to detect ground clearance, which is the height from the ground surface in the traveling direction of the movable apparatus to the movable apparatus.

An example of the calculation method will be explained with reference to FIG. 4. FIG. 4 is a diagram showing an example of a method for obtaining a ground clearance h in a traveling direction when the vehicle 1 is traveling backward.

Here, the distance from camera unit 13 to the lowermost portion of parking block 2a is x, the angle from the horizontal direction of the camera unit 13 to the ground surface and the lowermost portion of the parking block 2a is $\theta$, and the distance from the horizontal direction of the camera unit 13 to the ground surface is y. In addition, the distance from the horizontal direction of the optical axis of the camera unit 13 to the bottom of the vehicle 1 body is z, and the ground clearance in the traveling direction of the vehicle 1 is h.

Here, the angle of the optical axis with respect to the horizontal direction of the ground surface of the camera unit 13 may be obtained by, for example, a tilt sensor in the camera unit (not shown). In contrast, the angle to the lowermost portion of the parking block 2a with respect to the optical axis of the camera unit 13 can be obtained from the optical characteristics of the camera unit 13 and the acquired image, and is set to a negative value if above the optical axis and a positive value if below the optical axis.

The sum of these is used to calculate the angle $\theta$. In addition, because the distance x can be acquired from the result of the parking block information acquisition unit 41b, the distance y can be calculated by $y = x \times \sin \theta$.

Furthermore, because the camera unit 13 is typically fixed to a vehicle body, the distance z is constant and known. Therefore, the ground clearance h of vehicle 1 can be calculated by $h = y - z$. In this manner, ground clearance detection can be performed based on a position of the image capturing unit with respect to the movable apparatus and the position of the obstacle on the image of the image capturing unit.

Above, although an example of a method for obtaining the ground clearance of the vehicle 1 in the traveling direction in step S103 has been explained with reference to FIG. 4 above, the suspension state of the vehicle 1, or a distance-measuring sensor attached under the body of the vehicle 1 may be used to calculate the ground clearance.

That is, a sensor that measures the distance to the ground in the traveling direction of the movable apparatus may be provided, and the ground clearance may be detected based on the distance to the ground that has been acquired by the above-described sensor. In addition, although a case in which the ground clearance is calculated with reference to parking block 2a has been explained as an example, a configuration in which the parking block 2b is used for calculation is also possible.

In step S104, the CPU 43 compares the position and height of the parking blocks 2a and 2b that were acquired in step S102 to the ground clearance of the vehicle 1 in the traveling direction that was calculated in step S103, and determines whether or not the ground clearance is lower than the height of the parking blocks.

That is, step S104 functions as a contact determination step (contact determination unit) to determine whether or not the movable apparatus and the obstacle come into contact with each other in the traveling direction of the movable apparatus based on the position and height of the obstacle and the ground clearance. Then, contact is determined in a case in which the height of the obstacle is higher than the ground clearance, and in which the obstacle is located in the traveling direction of the movable apparatus.

At this time, the higher of the height among parking block 2a or parking block 2b is used. In a case in which the CPU 43 determines that the ground clearance is higher than the height of the parking block, this processing is terminated. In contrast, in a case in which the CPU 43 determines that the ground clearance is equal to or less than the height of the parking block, it advances the processing to step S105.

In step S105, the CPU 43 executes processing for issuing a warning to the driver. That is, step S105 is a step in which a warning is output in a case in which it has been determined in step S104 that contact will occur.

Specifically, in the present embodiment, the CPU 43 outputs an instruction to superimpose a warning image on the display image that is generated by the display image creation unit 41c. Examples of a warning image will be explained with reference to FIGS. 5 to 8.

FIG. 5 is a diagram showing one example of a warning display that has been superimposed on an overhead image that is displayed on the display unit 50 of the example. In a case in which an overhead image that has been created by the display image creation unit 41c is generated as a display image, a warning image 51, as shown in FIG. 5, can be superimposed to warn the driver. Thus, in the image display image creation unit 41c, an overhead image may be created from the image of the image capturing unit, and an image may be created in which a warning display based on the result of the contact determination is superimposed on the overhead image.

Figure 6:
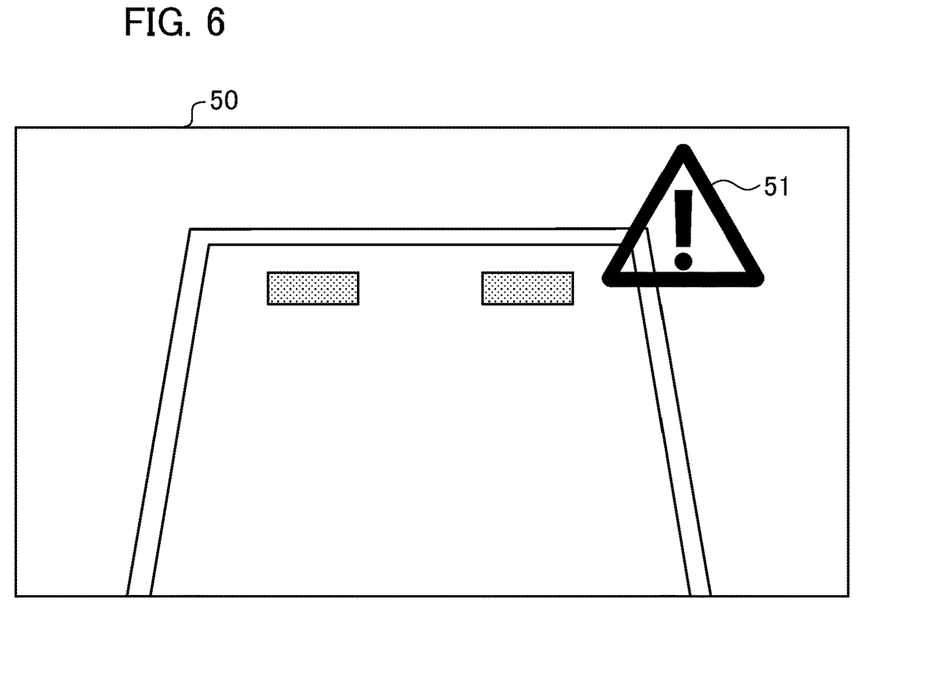
FIG. 6 is a diagram showing one example of a warning display that has been superimposed on an image in a traveling direction that is displayed on the display unit 50 of the example.

FIG. 6 is a diagram showing one example of a warning display that has been superimposed on an image in a traveling direction that is displayed on the display unit 50 of the example. In FIG. 6, in a case in which an image in the direction of travel that has been extracted by the display image creation unit 41c is generated as a display image, the warning image 51 is superimposed to warn the driver.

In this manner, the display image creation unit 41c may create a traveling direction image with respect to the traveling direction of the movable apparatus from the image of the image capturing unit, and create an image in which the warning display that is based on the result of the contact determination is superimposed on the traveling direction image.

It should be noted that it is preferable to superimposedly display the warning display 51 in FIGS. 5 and 6 at a position that does not cover the parking blocks 2a and 2b.

Figure 7:
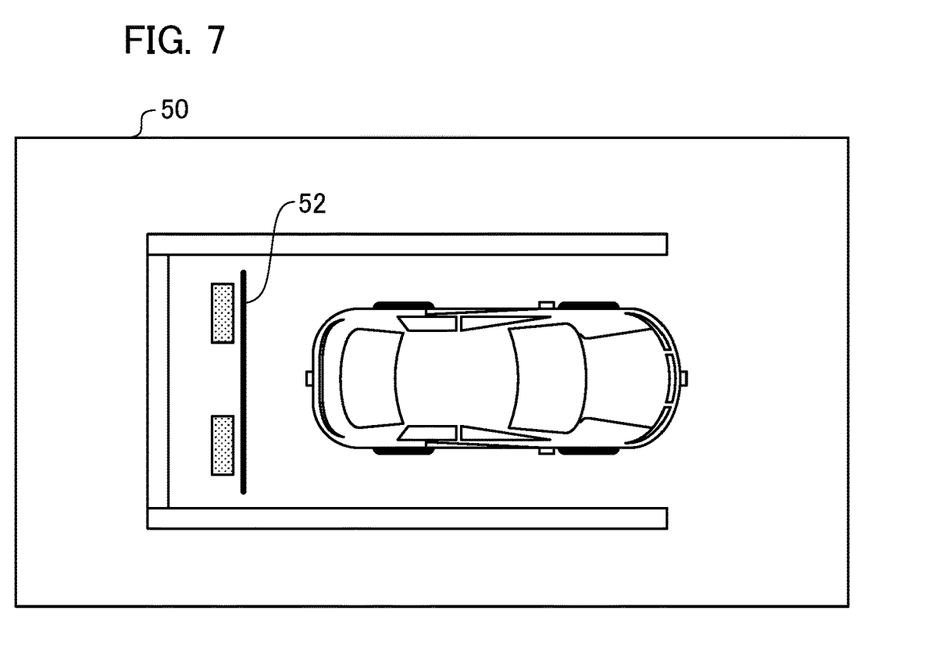
FIG. 7 is a diagram showing another example of a warning display that has been superimposed on an overhead image that is displayed on the display unit 50 of the example.

FIG. 7 is a diagram showing another example of a warning display that has been superimposed on an overhead image that is displayed on the display unit 50 of the example. In FIG. 7, in a case in which the overhead image that has been created by the display image creation unit 41c is generated as a display image, the vehicle body of the vehicle 1 and a position 52 ahead of the parking blocks at which a parking block does not come into contact with the vehicle 1 are superimposedly displayed.

Thereby, it is possible to indicate to the driver the position where it is possible to park safely. A position at which there is no contact can be calculated by setting the position at a predetermined distance (for example, 30 cm) ahead with respect to the shorter among the distances to the parking blocks 2a and 2b that have been detected by the parking block information acquisition unit 41b.

At this time, a case in which the installation position of the camera unit 13 is shifted forward or backward from the lower rear end portion of the vehicle is also considered. Then, when the vehicle 1 is backing up, by superimposedly displaying a part at which the distance to a parking block is, for example, 30 cm from the lower rear end portion of the vehicle, it is possible to display the position at which parking is possible without contact between the lower rear end portion of the vehicle body and the parking block.

Figure 8:
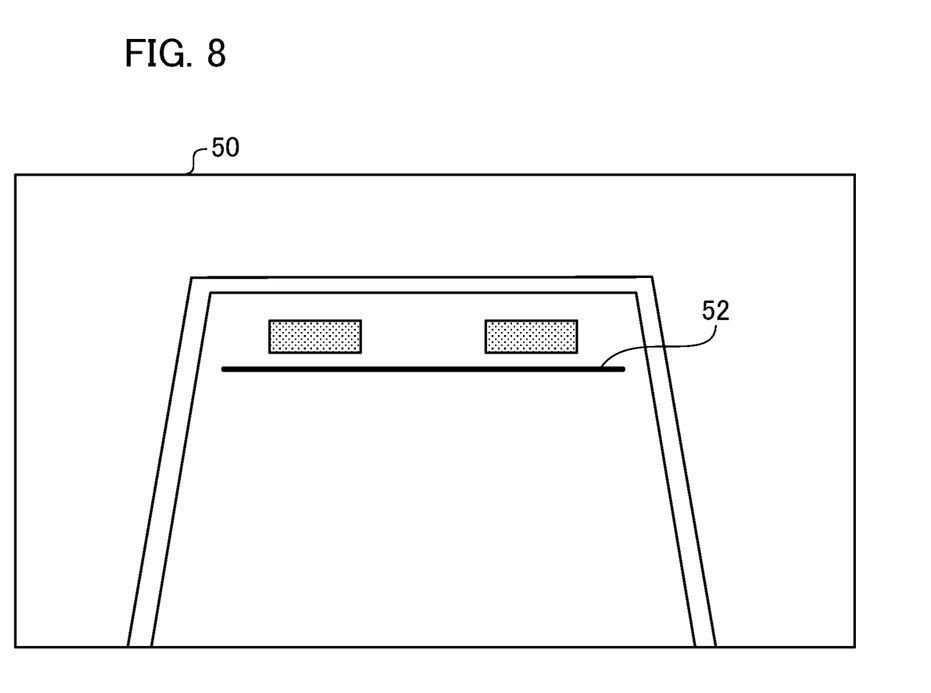
FIG. 8 is a diagram showing another example of a warning display that has been superimposed on an image in a traveling direction that is displayed on the display unit 50 of the example.

FIG. 8 is a diagram showing another example of a warning display that has been superimposed on an image in a traveling direction that is displayed on the display unit 50 of the example. In FIG. 8, in a case in which the image in the traveling direction that has been extracted by the display image creation unit 41c is generated as a display image, the position 52 at which the vehicle body of the vehicle 1 and the parking block do not come into contact is superimposedly displayed. Thereby, it is possible to indicate to the driver the position where it is possible to park safely.

It should be noted that although an example of displaying on the display unit by superimposing a warning image on the display image that is generated by the display image creation unit 41c as a way to warn the driver has been explained, there is no such limitation in a case in which the driver is made aware of the possibility of contact.

For example, a speaker control unit that controls the speakers that are mounted on the vehicle 1 may be provided and configured to be capable of communicating with the image processing system 100, and the CPU 43 may cause the speaker control unit to output a warning sound. That is, the warning output is not limited to a warning image display, and may also include a warning by an audio output.

In addition, for example, a sensor that acquires suspension state information, which is the state information about the suspension, may be provided, and in a case in which the sensor detects the ground clearance of the movable apparatus by the above sensor and determines that the loadage is large, an audible announcement may be made so as to reduce the loadage. In addition, a configuration in which the above-described audio warning is combined with a warning via an image display is also possible.

In addition, in step S105, the CPU 43 may be configured to output an instruction to the traveling control unit (ECU) to apply braking. That is, at the time of the warning output, a deceleration instruction or a stop instruction may be output to the movable apparatus.

By operating an automatic brake in this manner, contact can be avoided even in a case in which the driver is unaware of the warning, or the response to the warning is delayed.

Figure 9A:
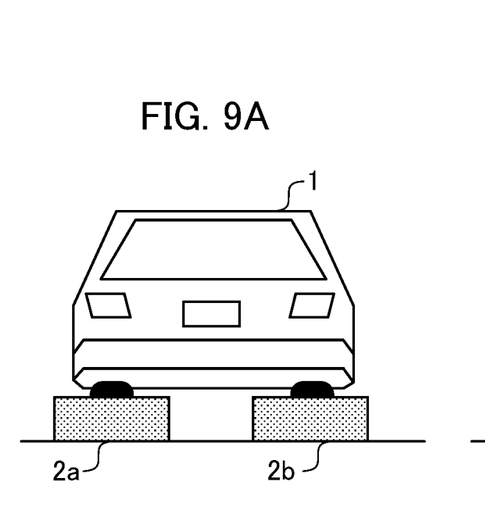
FIGS. 9A and 9B are diagrams that show a state in which a vehicle 1 is parked in reverse, as viewed from the rear of the vehicle.

By operating each part of the present embodiment as described above, the effect that is obtained is explained with reference to FIG. 9. FIGS. 9A and 9B are diagrams of the vehicle 1 in a state in which it is parked in reverse, as viewed from the rear of the vehicle. FIG. 9A is a diagram showing a case in which the height from the ground in the traveling direction of the vehicle 1 to the lower portion of the vehicle body (ground clearance) is higher than the parking blocks 2a and 2b.

In the case that is shown in FIG. 9A, the vehicle body of vehicle 1 can be parked without coming into contact with the parking blocks 2a and 2b. At this time, the image processing system 100 determines that there is no contact and does not issue a warning to the driver. Thus, unnecessary warnings can be reduced.

Figure 9B:
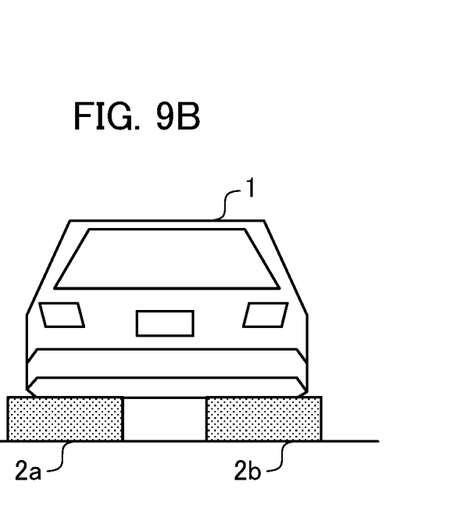

In contrast, FIG. 9B is a diagram showing a case in which the ground clearance in the traveling direction of the vehicle 1 is lower than the parking blocks 2a and 2b. In the case that is shown in FIG. 9B, the vehicle body may contact the parking blocks 2a and 2b prior to the tires of the vehicle 1.

For example, in a case in which the loadage of vehicle 1 is large, the body of vehicle 1 is lowered, thereby increasing the possibility of contact between the vehicle body of the vehicle 1 and the parking blocks 2a and 2b. In such a case, because the image processing system 100 of the present embodiment determines that contact will occur by calculating the ground clearance of the bottom of the vehicle 1 in the traveling direction and comparing it with the height of the parking blocks 2a and 2b, and then issues a warning to the driver, it is possible to warn the driver appropriately.

It should be noted that, in the above example, the configuration is such that the parking blocks 2a and 2b in the traveling direction of the vehicle 1 are detected, and a warning is issued in a case in which the ground clearance is lower than the parking blocks 2a and 2b. However, a detection target in the present embodiment is not limited to a parking block. For example, it can be an obstacle other than a parking block (such as a fallen object on the road, an animal, or a human being).

It should be noted that the above example has been explained as an example of an image processing system that is mounted on a movable apparatus, such as a vehicle. However, the movable apparatus in the example is not limited to a vehicle such as an automobile, and may be any movable apparatus that moves on the ground, such as a train, a robot, and the like.

In addition, the image processing system of the example may or may not be mounted on the movable apparatus. Furthermore, for example, the configuration of these examples can be applied in a case in which a movable apparatus is controlled remotely.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing system through a network or various storage media. Then, a computer (or a CPU, an MPU, or the like) of the image processing system may be configured to read and execute the program. In such a case, the program and the storage medium storing the program configure the present invention.

This application claims the benefit of Japanese Patent Application No. 2022-092250, filed on Jun. 7, 2022, which is hereby incorporated by reference herein in its entirety.

What is claimed is:

1. An image processing system, comprising:
at least one processor, and a memory including instructions stored thereon, which, when executed by the at least one processor, cause the system to; or a circuit configured to:
detect a position and a height of an obstacle in a traveling direction of a movable apparatus;
detect a ground clearance, which is the height from a ground surface in the traveling direction of the movable apparatus to the movable apparatus;
determine whether or not the movable apparatus and the obstacle will come into contact with each other in the traveling direction of the movable apparatus based on the position and height of the obstacle, and the ground clearance; and
output a warning in a case in which it has been determined that contact will occur,
wherein the system further comprises an image sensor, and
wherein the ground clearance detection is based on a position of the image sensor with respect to the movable apparatus, and a position of the obstacle on an image of the image sensor.

2. The image processing system according to claim 1, wherein the at least one processor or circuit is further configured to cause the system to: determine that contact is made in a case in which the height of the obstacle is higher than the ground clearance.

3. The image processing system according to claim 1, further comprising at least one image sensor, wherein the at least one processor or circuit is further configured to function cause the system to:
create an overhead image from the image of the image sensor, and a warning display based on the result of the contact determination.

4. The image processing system according to claim 1, further comprising at least one sensor, wherein the at least one processor or circuit is further configured to further cause the system to:
a display image creation unit configured to create an image in a traveling direction of the movable apparatus, and a warning display based on the result of the contact determination.

5. The image processing system according to claim 1, wherein a warning is provided by an audio output unit.

6. The image processing system according to claim 1, wherein the warning includes a deceleration instruction.

7. The image processing system according to claim 1, wherein the at least one processor or circuit is further configured to further cause the system to:
acquire suspension state information, which is the state information of the suspension of the movable apparatus, and
detect the ground clearance of the movable apparatus based on the suspension state information.

8. The image processing system according to claim 1, further comprising a sensor that measures a distance to the ground in the traveling direction of the movable apparatus, and detects the ground clearance based on the distance to the ground that has been acquired by the sensor.

9. The image processing system according to claim 1, wherein the at least one processor or circuit is further configured to further cause the system to: input a data set that includes an image of the obstacle, and detects the position and height of the obstacle in the traveling direction of the movable apparatus from an input image by using a learning model learned in advance to detect the position and height of the obstacle in the traveling direction of the movable apparatus from the input image.

10. The image processing system according to claim 1, wherein the obstacle includes a parking block.

11. An image processing method comprising:
   an obstacle information acquisition step of detecting a position and a height of an obstacle in a traveling direction of a movable apparatus,
   a ground clearance detection step of detecting the ground clearance, which is the height from the ground surface in the traveling direction of the movable apparatus to the movable apparatus,
   a contact determination step of determining as to whether or not the movable apparatus and the obstacle will come into contact with each other, based on the height of the obstacle and the ground clearance,
   a warning output step of outputting a warning in a case in which it has been determined by the contact determination step that contact will occur,
   an image capturing step, and
   wherein the ground clearance detection step detects the ground clearance based on a position of an image sensor with respect to the movable apparatus, and a position of the obstacle on an image of the image sensor.

12. A non-transitory computer-readable storage medium configured to store a computer program comprising instructions for executing the following processes:
   an obstacle information acquisition step of detecting a position and a height of an obstacle in a traveling direction of a movable apparatus,
   a ground clearance detection step of detecting the ground clearance, which is the height from the ground surface in the traveling direction of the movable apparatus to the movable apparatus,
   a contact determination step of determining as to whether or not the movable apparatus and the obstacle will come into contact with each other, based on the height of the obstacle, and the ground clearance,
   a warning output step of outputting a warning in a case in which it has been determined by the contact determination step that contact will occur,
   an image capturing step, and
   wherein the ground clearance detection step detects the ground clearance based on a position of an image sensor with respect to the movable apparatus, and a position of the obstacle on an image of the image sensor.

* * * * *